United States Patent
Gerwatosky

(10) Patent No.: US 12,495,765 B1
(45) Date of Patent: Dec. 16, 2025

(54) PET WATER BOWL TANK

(71) Applicant: John Gerwatosky, Huntington Beach, CA (US)

(72) Inventor: John Gerwatosky, Huntington Beach, CA (US)

( * ) Notice: Subject to any disclaimer, the term of this patent is extended or adjusted under 35 U.S.C. 154(b) by 0 days.

(21) Appl. No.: 19/304,527

(22) Filed: Aug. 19, 2025

Related U.S. Application Data

(60) Provisional application No. 63/850,333, filed on Jul. 24, 2025.

(51) Int. Cl.
| | |
|---|---|
| *A01K 7/00* | (2006.01) |
| *A01K 7/02* | (2006.01) |
| *A01K 7/04* | (2006.01) |
| *A01K 7/06* | (2006.01) |

(52) U.S. Cl.
CPC ............... *A01K 7/04* (2013.01); *A01K 7/005* (2013.01); *A01K 7/025* (2013.01); *A01K 7/06* (2013.01)

(58) Field of Classification Search
CPC .......... A01K 7/04; A01K 7/005; A01K 7/025; A01K 7/06
USPC .......................................................... 119/78
See application file for complete search history.

(56) References Cited

U.S. PATENT DOCUMENTS

| | | | |
|---|---|---|---|
| 11,412,707 B1* | 8/2022 | Garcia | A01K 7/022 |
| 2013/0092090 A1* | 4/2013 | McCallum | A01K 1/0356 119/74 |
| 2013/0199454 A1* | 8/2013 | Lipscomb | A01K 7/00 119/74 |
| 2015/0189856 A1* | 7/2015 | Alexander | A01K 39/02 119/74 |
| 2016/0106057 A1* | 4/2016 | DeWaard | B01D 36/04 210/209 |
| 2023/0217893 A1* | 7/2023 | Tompkins | A01K 5/0135 119/61.54 |

\* cited by examiner

*Primary Examiner* — Richard T Price, Jr.
(74) *Attorney, Agent, or Firm* — Wilson Dutra, PLLC; Camille A. Wilson

(57) ABSTRACT

A pet hydration system is disclosed that integrates a self-refilling reservoir, filtration, and spill-mitigation features in a compact assembly. A base defines a reserve basin fluidly coupled to a dispensing basin through a replaceable filter that may be passive or pump-assisted and optionally incorporates ultraviolet-C sterilization. An inverted water tank seats on the base and gravity-feeds the reserve basin; an air-lock vent admits replacement air only when the reserve-basin level drops, preventing continuous pour-out. Water flows through the filter into the dispensing basin, where a buoyant stopper rises to contact an annular ridge of a removable rim, capping the basin at a preset height. Depressing the stopper with a pet's muzzle exposes a freshwater layer and permits additional flow, after which the stopper re-seats to minimize splashing and debris ingress. The system delivers continuously replenished, contaminant-reduced drinking water while reducing mess and maintenance.

20 Claims, 7 Drawing Sheets

PET WATER BOWL TANK

CROSS-REFERENCE TO RELATED APPLICATION

This application claims priority to and the full benefit of U.S. Provisional Patent Application Ser. No. 63/850,333 (filed Jul. 24, 2025, and titled "Pet Water Bowl With Tank"), the entire contents of which are incorporated in this application by reference.

BACKGROUND

According to American Veterinary Medical Association, 45.5 percent of U.S. households own a dog, and 32.1 percent of U.S. households own a cat. Hydration is critical to pet health. Every important body function requires water and without the right amount, a pet can become dehydrated and ill very quickly. Both cats and dogs, on average, need about one ounce of water per pound of their body weight daily.

Traditionally pet owners have relied on the simplest of watering devices: open bowls refilled by hand or basic gravity dispensers that let an inverted bottle drip into a dish. These fixtures are inexpensive, easy to find, and seemingly adequate for delivering daily hydration. Owners merely pour fresh water, set the bowl on the floor, and let the animal lap at will. This routine has gone largely unchanged, even as pets have become full-fledged family members and homes have grown more sensitive to hygiene, convenience, and floor protection.

The problem is that open bowls and basic gravity dishes demand frequent human attention and still create a mess. Large-breed dogs thrust muzzles deep into the water, sloshing liquid onto hardwood or carpet. Cats flick water with their tongues or paws. Every gulp deposits saliva, fur, and food crumbs that quickly sour the standing supply. Owners may need to refill and scrub bowls several times a day, yet spills, biofilm, and "wet beard" drips persist. These problems pose slip hazards, damaging floors, and undermining the pet's access to clean, appealing water.

SUMMARY OF THE DISCLOSURE

What is needed is an automatic pet water bowl that minimizes spilling. The disclosure describes an apparatus that has a base containing both a reserve basin and a dispensing basin, a filter positioned between the two basins to provide fluid communication, and a tank that sits removably on the base so water gravity-feeds into the reserve basin. A buoyant stopper floats inside the dispensing basin. The removable rim includes an annular ridge narrower than the stopper and captures the stopper. Water delivered from the tank passes through the filter into the dispensing basin; the stopper rises to meet the rim and cap the basin at a set level, while being capable of being depressed by a pet to admit more water over its surface.

In some embodiments, the filter used in the apparatus employs a multilayer passive cartridge constructed with a pre-screen, activated-carbon granules, and a micro-porous membrane. In some embodiments, the filter used in the apparatus includes a low-voltage pump arranged to circulate water through the filter and may contains ultraviolet-C light emitters that sterilize the circulating water.

In some embodiments, the stopper is formed from a rigid top plate, a bottom plate, and at least one standoff that spaces the plates apart to create an internal air chamber that supplies buoyancy. In some embodiments, the stopper is a rigid, sealed shell whose enclosed air chamber provides the buoyant force. In some embodiments, the stopper is biased upward toward the rim by a spring anchored to a floor of the dispensing basin.

In some embodiments, the apparatus includes a sensor that detects stopper displacement and a wireless transmitter that sends fluid-level information to an external device.

The disclosure also presents a method for dispensing filtered water to a pet. The method involves supplying an apparatus having a base with a reserve basin and a dispensing basin, a filter between them, a tank coupled to the reserve basin, a buoyant stopper in the dispensing basin, and a rim whose annular ridge is narrower than the stopper. Water is allowed to gravity-feed from the tank to the reserve basin and then pass through the filter into the dispensing basin. The stopper floats upward until it meets the rim to limit the water height, is depressed by the pet to expose a fresh layer of water and admit more flow, and the system automatically replenishes water when the reserve-basin level drops by admitting air into the tank. In some embodiments, the method for dispensing filtered water to a pet may also include sensing the displacement of the stopper and wirelessly transmitting fluid-level data to an external device.

In some embodiments, an apparatus includes a base that defines a reserve basin and a dispensing basin connected by a flow path, a tank feeding water to the reserve basin, a filter located in the flow path, a buoyant stopper in the dispensing basin, and a rim at the top of the dispensing basin. The rim has an annular ridge forming a central aperture, and the stopper floats upward to seal against this ridge and cap the dispensing basin when water reaches a set height. In some embodiments, the apparatus includes a sensor configured to detect displacement of the stopper.

A number of embodiments of the present disclosure will be described. While this specification contains many specific implementation details, these should not be construed as limitations on the scope of any disclosures or of what may be claimed, but rather as descriptions of features specific to particular embodiments of the present disclosure. It is understood to those skilled in the art that variations, modifications, and alterations may be apparent. It will be understood that various modifications may be made without departing from the spirit and scope of the disclosure.

BRIEF DESCRIPTION OF THE DRAWINGS

The accompanying drawings that are incorporated in and constitute a part of this specification illustrate several embodiments of the disclosure and, together with the description, serve to explain the principles of the disclosure.

The Figures are not necessarily drawn to scale, as their dimensions can be varied considerably without departing from the scope of the present disclosure.

DETAILED DESCRIPTION

The present disclosure provides generally for a pet water bowl with a tank and a stopper to continuously provide filtered water to a pet while minimizing spillage.

In the following sections, detailed descriptions of examples and methods of the disclosure will be given. The description of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Figure 1:
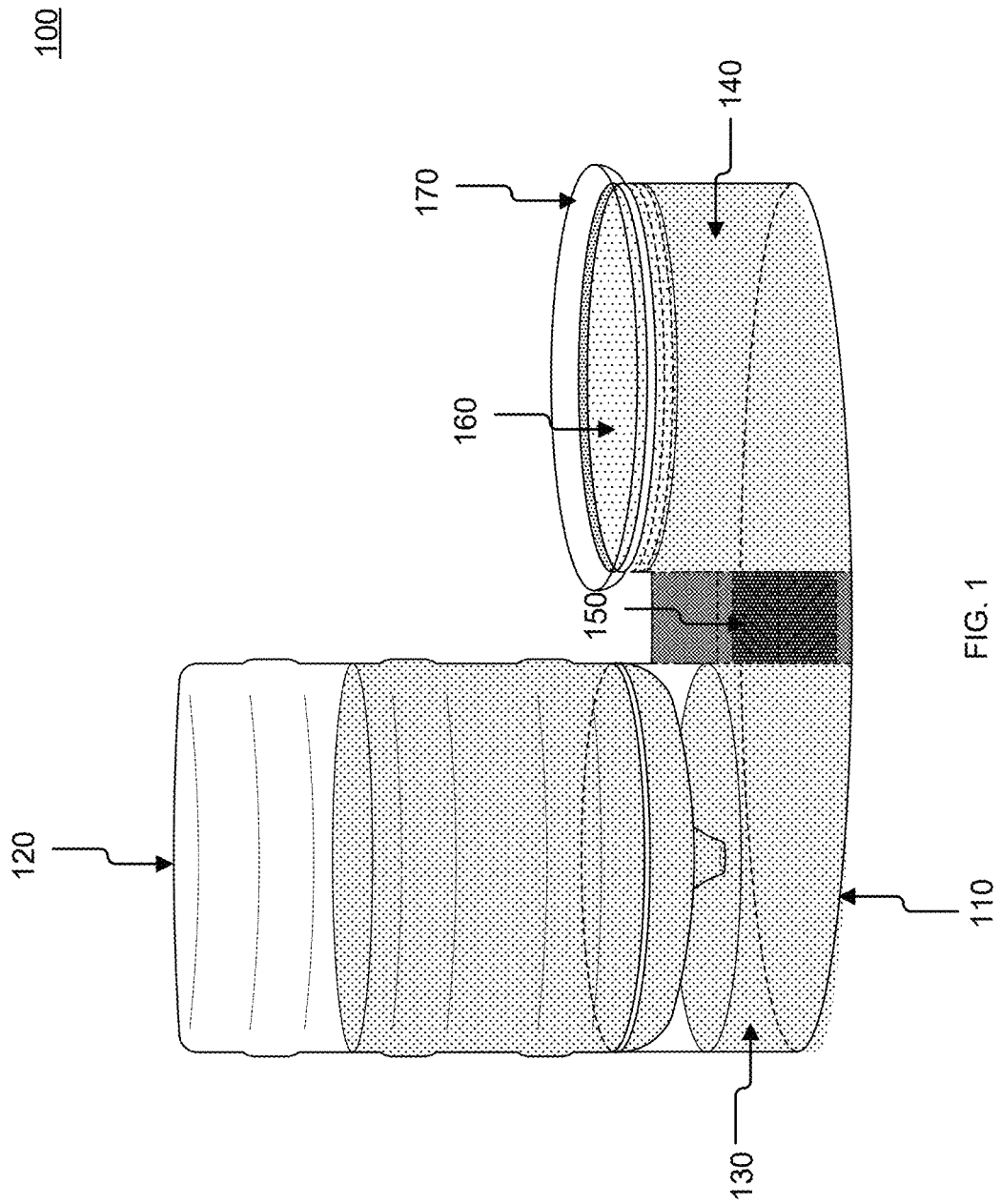
FIG. 1 illustrates a pet water bowl with tank, according to some embodiments of the present disclosure.

Referring now to FIG. 1, a pet water bowl with tank 100, according to some embodiments of the present disclosure, is illustrated. The pet water bowl with tank 100 includes a base 110 and an overlying tank 120. The base 110 is internally partitioned into a reserve basin 130 and a dispensing basin 140, the two basins being placed in fluid communication by an interposed filter 150. The dispensing basin 140 includes a buoyant stopper 160 that operates as an automatic spill-prevention valve. The dispensing basin 140 also includes a raised rim 170. The rim 170 preferably includes an annular ridge with a circumference less than the stopper 140. When the tank 120 is seated on the base, its outlet communicates directly with the reserve basin 130 so that water is gravity-fed into the reserve basin until the internal head pressure within the tank equalizes with the water level in the reserve basin.

The base 110 can be economically produced as a unitary shell by injection-molding food-grade thermoplastics that define the reserve basin 130, dispensing basin 140, and filter cavity 150 in a single shot. The single shot manufacturing minimizes assembly points susceptible to leakage. The material for manufacturing may be high-density polyethylene (HDPE), polypropylene (PP), or acrylonitrile-butadiene-styrene (ABS). In some embodiments, the mold may incorporate stainless-steel or copper inserts at wear surfaces to improve durability and provide inherent antimicrobial protection, while over-molded silicone gaskets form integral seals around the filter seat and tank interface. In some embodiments, the base 110 may be blow-molded as a two-piece housing that is later ultrasonically welded or solvent-bonded together. In some embodiments, the base 110 may be rotational-molded for thicker, impact-resistant walls suited to outdoor use. In some embodiments, the base 110 may be additively manufactured (3-D printed) prototypes that enable rapid customization of basin volumes. Regardless of manufacturing process, surfaces contacting water are preferably treated with a BPA-free, FDA-compliant antimicrobial coating or compounded with silver-ion additives to inhibit bacterial growth. Non-contact exterior zones may incorporate recycled polymers for sustainability. In some embodiments, non-contact exterior zones may incorporate slip-resistant elastomer pads that can be compression-molded onto the base underside to prevent skidding.

The tank 120 may be a commercially available, five-gallon water bottle configured for upside-down seating on the base 110, where an annular gasket or equivalent sealing interface establishes a fluid-tight junction between the tank outlet and the inlet of the reserve basin 130. In other embodiments, the tank 120 may be permanently integrated with the base. For example, the tank 120 may be blow-molded as a monolithic unit or ultrasonically welded. In such embodiments, the tank 120 may be provided with a top-mounted, removable cap or hinged lid that permits refilling without detachment from the base. In some embodiments, further variations of the tank 120 may be included, such as (i) tanks with differing volumetric capacities (for example, one-, three-, or ten-gallon) to suit pet size or owner refill frequency; (ii) tanks fabricated from transparent, translucent, or opaque polymers, glass, or stainless steel, optionally incorporating antimicrobial or BPA-free materials; (iii) tanks equipped with molded-in level indicators, float gauges, or electronic level sensors for visual or app-based monitoring; (iv) insulated or double-walled tanks to moderate water temperature; (v) disposable, single-use bladder cartridges that collapse as water is dispensed, minimizing air ingress; and (vi) modular tank cartridges containing flavor additives or mineral supplements that dissolve as water is drawn. Each of these configurations is contemplated as interchangeable within the disclosed system, provided the tank maintains a leak-proof connection with the base and reliably supplies water to the reserve basin.

The filter element 150 is positioned in a flow path bridging the reserve basin 130 and the dispensing basin 140 and may assume either a passive or active configuration. In its simplest, passive form, the filter comprises a replaceable cartridge seated in a watertight recess between the basins and relying solely on the hydrostatic head generated in the reserve basin to drive water through a multilayer medium. The filter's 150 multilayer medium may be a coarse pre-screen for hair and debris, followed by activated-carbon granules and a final micro-porous membrane capable of removing bacteria, protozoan cysts, and fine particulates. For enhanced performance, the cartridge may incorporate antimicrobial silver ions or ceramic spheres to inhibit biofilm growth.

In some embodiments, the filter housing may be equipped with a low-voltage, submersible pump that periodically or continuously circulates water through the same or additional treatment stages, such as UV-C LEDs for microbial sterilization, ion-exchange resins for hardness reduction, or oxygenation diffusers that improve palatability. The pump may be governed by a float switch, capacitive level sensor, or programmable timer, and powered via a detachable USB-C cable, battery pack, or solar trickle charger embedded in the base. Both passive and active filter cartridges are user-serviceable to permit rapid replacement without tools, ensuring the pet always receives freshly filtered water while minimizing maintenance effort for the owner.

The stopper 160 is formed as a lightweight disk or dome sized to nest closely beneath the basin's upper rim 170. When the dispensing basin 140 fills to its designed maximum level, hydrostatic lift urges the stopper 160 upward into sealing engagement with the annular ridge of the rim 170, thereby capping the dispensing basin 140 and blocking any further rise that could lead to overflow or splashing. Because the stopper 160 rises to cover the water between lapping events, only a shallow film remains exposed, making it difficult for a paw swipe or vigorous drinking action to displace enough water to cause a spill. To access more than this controlled volume, the animal must depress the floating stopper with its muzzle or tongue, momentarily submerging it and permitting a fresh layer of water to flow over and replenish the drinking surface. The raised rim 170 further reduces any splashing that may occur while a pet is drinking from the dispensing basin 140. In some embodiments, the inner wall of the dispensing basin 140 may include a molded boss to limit downward travel of the stopper 140. The molded boss prevents pets from depressing the stopper 160 too far down that would cause spillage.

As pets drink from the dispensing basin 140, the liquid level in that basin drops, creating a differential that draws additional water from the reserve basin 130 through the filter 150. This, in turn, lowers the reserve-basin level and causes the tank 120 to discharge a fresh volume of water into the reserve basin. In this manner, a self-regulating cycle is established in which the tank continuously replenishes the reserve basin, the filter continuously conditions water migrating to the dispensing basin, and the dispensing basin delivers a consistently filled, contaminant-reduced drinking supply to the pet.

In some embodiments, the exposed surface of the buoyant stopper 160 may be molded from, or coated with, a polymer compounded with silver-ion or copper-oxide additives. These antimicrobial agents may inhibit bacterial biofilm formation at the primary tongue-contact region, maintaining water freshness between cleanings and further safeguarding pet health.

The rim 170 encircles the top of the dispensing basin 140 and terminates in an inwardly projecting annular ridge sized to leave a central aperture through which the shallow film of water is exposed. The inner circumference of the ridge is smaller than the outer diameter of the buoyant stopper 160, thereby acting as a mechanical retainer that prevents the stopper from lifting or being pried out of the basin even when it is fully buoyant or jostled by a pet.

The rim 170 is preferably removable. The rim 170 couples to the basin wall by an interface that can be removed to access and sanitize the stopper 160 and the interior surfaces of the dispensing basin 140. Such interface may be a quarter-turn bayonet, threaded collar, or snap-fit detents. Once cleaned, the rim 170 is reinstalled to re-establish the controlled opening and secure stopper retention, maintaining the spill-resistant functionality of the system.

In some embodiments, the vertical displacement of the stopper 140 may be sensed by a magnetic reed switch, optical interrupter, or linear Hall-effect sensor mounted beneath the basin. Real-time position or periodic data may be transmitted via Bluetooth® or Wi-Fi to a companion application, allowing owners to monitor water-level trends, receive refill alerts, or log pet hydration habits. In such embodiments, the pet water bowl with tank 100 may include one or more sensors that detect position of the stopper, one or more processors, and a wireless communication device.

In some embodiments, the tank seat may incorporate an air-lock flow-control architecture to assist in smooth replenishment from the upside-down tank 120. An annular gasket may surround the tank outlet while a discrete vent path admits replacement air only when the water level in the reserve basin 130 falls, thereby maintaining ambient-pressure equilibrium and preventing continuous pour-out or back-siphoning.

In some embodiments, the underside of the removable rim 170 may be chamfered or smoothly radiused so that a cat's vibrissae do not brush against a hard edge while drinking. This "whisker-friendly" geometry minimizes whisker stress or fatigue, encouraging natural lapping behavior and reducing the likelihood that the animal will avoid the bowl.

In some embodiments, the sidewall of the reserve basin 130 may include a transparent level window formed by an integrally molded clear thermoplastic insert or a narrow cut-out backed by an LED-lit sight glass. The window may provide an at-a-glance indication of remaining water volume without requiring the owner to lift or tilt the tank 120, and the optional backlight permits easy viewing in low-ambient-light environments.

In some embodiments, the floor of each basin may be fitted with a threaded drain plug or quarter-turn spigot. Opening the drain allows residual water to be evacuated quickly, facilitating filter changes and enabling the owner to run the basin components through a dishwasher cycle without splashing.

In some embodiments, the filter element 150 may be housed in a detachable cassette that slides laterally from a slot or swings out on a hinged door formed in the partition wall between the basins. A latch mechanism, such as a spring-biased catch or magnetic connection, may secure the cassette during use while being capable of being released with modest finger pressure, enabling fast, tool-free cartridge replacement without disassembling the main assembly.

In some embodiments, the underside of the base 110 may include a stainless-steel plate encapsulated within the plastic shell to lower the center of gravity of the pet water bowl 200 and resist tip-over by larger animals. In some embodiments, the underside of the base 110 may include over-molded elastomer feet may provide anti-skid traction on tile, hardwood, or carpeted surfaces while protecting the floor from scratches.

In some embodiments, the pet water bowl may include a sensor for passive fluid-level monitoring. The fluid level monitoring may be achieved by embedding magnetic reed switches, capacitive pads, or optical interrupters just below the maximum-fill level of the dispensing basin 140. When the level drops beneath a preset threshold, an indicator LED on the rim 170 or a BLE-enabled signal to a companion app may notify the owner that a refill or filter change is advisable, all without the need for active pumping components.

Figure 2:
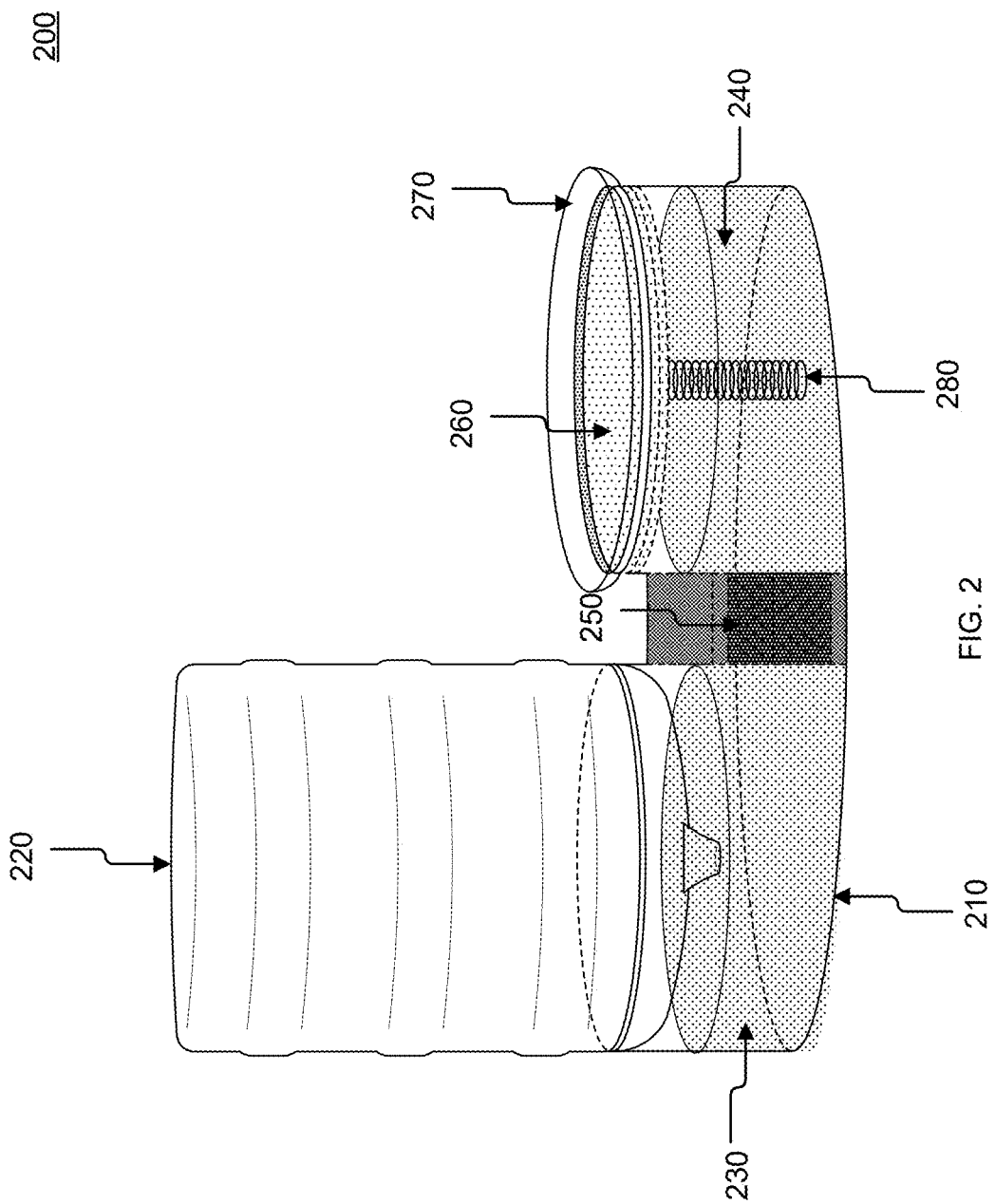
FIG. 2 illustrates a pet water bowl with tank, according to some embodiments of the present disclosure.

Referring now to FIG. 2, a pet water bowl with tank 200, according to some embodiments of the present disclosure, is illustrated. The pet water bowl with tank 200 includes a base 210 that internally defines a reserve basin 230 and a dispensing basin 240 arranged side-by-side and placed in fluid communication by an interposed filter 250. A detachable, preferably five-gallon water tank 220 seats atop the reserve basin 230, where a sealed interface allows gravity-fed replenishment of the reserve basin. The dispensing basin 240 also includes a raised rim 270. The rim 270 preferably includes an annular ridge with a circumference less than the stopper 140. Water migrates from the reserve basin 230 through the filter 250 into the dispensing basin 240, where a buoyant stopper 260 regulates the accessible water surface.

Unlike the configuration of FIG. 1, the stopper 260 is urged upward toward an annular rim 270 by a vertically oriented coil spring 280 anchored to the floor of the dispensing basin 240. When the basin reaches its design fill height, spring bias and buoyancy lift the stopper 260 into sealing engagement with the rim 270 to prevent overflow and limit splashing; as a pet drinks and depresses the stopper, the spring compresses, permitting additional water to flow into the dispensing basin until equilibrium is restored. Collectively, the base 210, basins 230/240, filter 250, spring-biased stopper 260, rim 270, and overlying tank 220 cooperate to provide a self-refilling, spill-resistant hydration system for pets.

In some embodiments, the spring 280 may be formed from corrosion-resistant, food-safe materials so that prolonged immersion of the spring 280 in water does not degrade its mechanical properties or introduce contaminants to the drinking water. The potential materials include, but are not limited to, 304 or 316 stainless steel, PEEK, or carbon steel coated with an FDA-compliant epoxy. To further inhibit noise and biofouling, the spring may be over-molded with a thin silicone or thermoplastic elastomer sleeve that cushions contact with the stopper 260 and the dispensing basin's 240 floor.

In some embodiments, the spring 280 may be housed within a guide structure molded into the dispensing basin 240 to maintain the alignment as the stopper 260 moves. Examples of such guide structure include, but are not limited to, a central cylindrical post, a telescoping sleeve, or a low-friction PTFE liner that surrounds the spring. This guidance prevents lateral skew, ensuring that the stopper seats evenly against the rim 270 and preserves a uniform seal around the full circumference.

In some embodiments, the spring 280 may be user-adjustable. In such embodiments, the floor of the dispensing basin may include a threaded or ratcheting spring seat. The user may adjust the spring seat to increase or decrease the preload on the spring 280 without disassembly. By rotating the seat (or inserting shims), an owner can calibrate the force required to depress the stopper, thereby tailoring flow resistance for different pet sizes or drinking behaviors while still preventing accidental spills.

In some embodiments, the dispensing basin 240 may include one or more upper and lower travel stops to protect against over-compression or over-extension. The annular ridge of the rim 270 may serve as the upper stop, halting the stopper 260 flush with the rim 270. The walls of the dispensing basin 240 may include a snap-on collar or molded boss to limit downward travel. These features prolong spring life, prevent the stopper from bottoming out on the basin floor, prevent a pet from depressing the spring too far down below an intended level and maintain predictable displacement.

In some embodiments, the entire spring-stopper subassembly may be designed to be removable as a single module. A quarter-turn bayonet interface or magnetic latch may be used to release the unit from the dispensing basin 240, permitting thorough cleaning or replacement. In some embodiments, all components that contact water are made from dishwasher-safe materials able to withstand common pet-safe detergents and temperatures up to 70° C.

In some embodiments, the coil spring 280 may be replaced with equivalent biasing elements. These include elastomeric bellows that compress axially, torsion springs acting on pivoted arms, opposed permanent magnets producing repulsive force, or miniature gas-charged pistons. The biasing elements provide the requisite upward bias to seat the stopper 260 against the rim 270 while allowing depression by a drinking pet to achieve the same spill-mitigation and flow-regulation.

Figure 3:
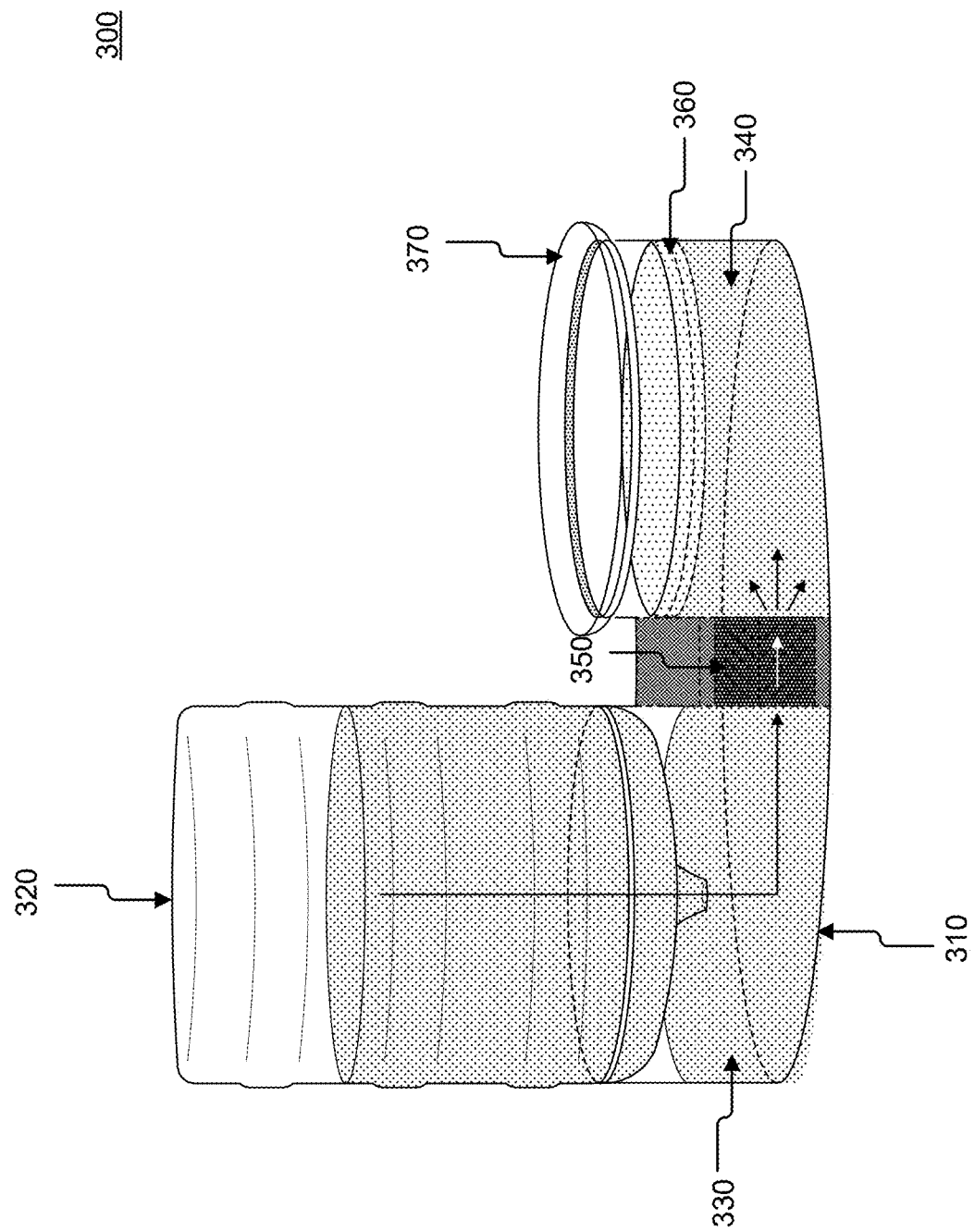
FIG. 3 illustrates a pet water bowl with tank, according to some embodiments of the present disclosure.

Referring now to FIG. 3, a pet water bowl with tank 300, according to some embodiments of the present disclosure, is illustrated. The pet water bowl with tank 300 substantially mirrors the structural arrangement described for FIG. 1: a base 310 is internally partitioned into a reserve basin 330 and a dispensing basin 340, the two basins being hydraulically linked by an intervening filter element 350. An inverted, removable water tank 320 seats atop the reserve basin 330, gravity-feeding water into the reserve basin whenever its level drops, while a removable rim 370 at the top of the dispensing basin retains a buoyant stopper 360 sized to remain captive beneath the rim's annular ridge.

During operation, water contained in the inverted tank 320 is held in place by atmospheric back-pressure until the liquid level in the reserve basin 330 drops when water is drawn downstream to the dispensing basin 340. This slight level decrease admits a bubble of air into the tank throat, breaking the air-lock and allowing an incremental charge of water to descend by gravity into the reserve basin 330. The hydrostatic head created in the reserve basin 330 then drives water laterally through the interposed filter 350, where contaminants are removed before the purified stream enters the dispensing basin 340. As the dispensing basin 340 fills, buoyant lift exerted on the stopper 360 increases until the stopper 360 rises and seats against the underside of the rim 370, capping the dispensing basin 340 at a predetermined depth and preventing overflow. When a pet drinks and the water surface recedes, the stopper 360 descends under its own weight or due to downward pressure exerted by the pet, reopening the flow path so the cycle can repeat. This maintains a self-regulating, continuously filtered supply of drinking water.

Figure 4:
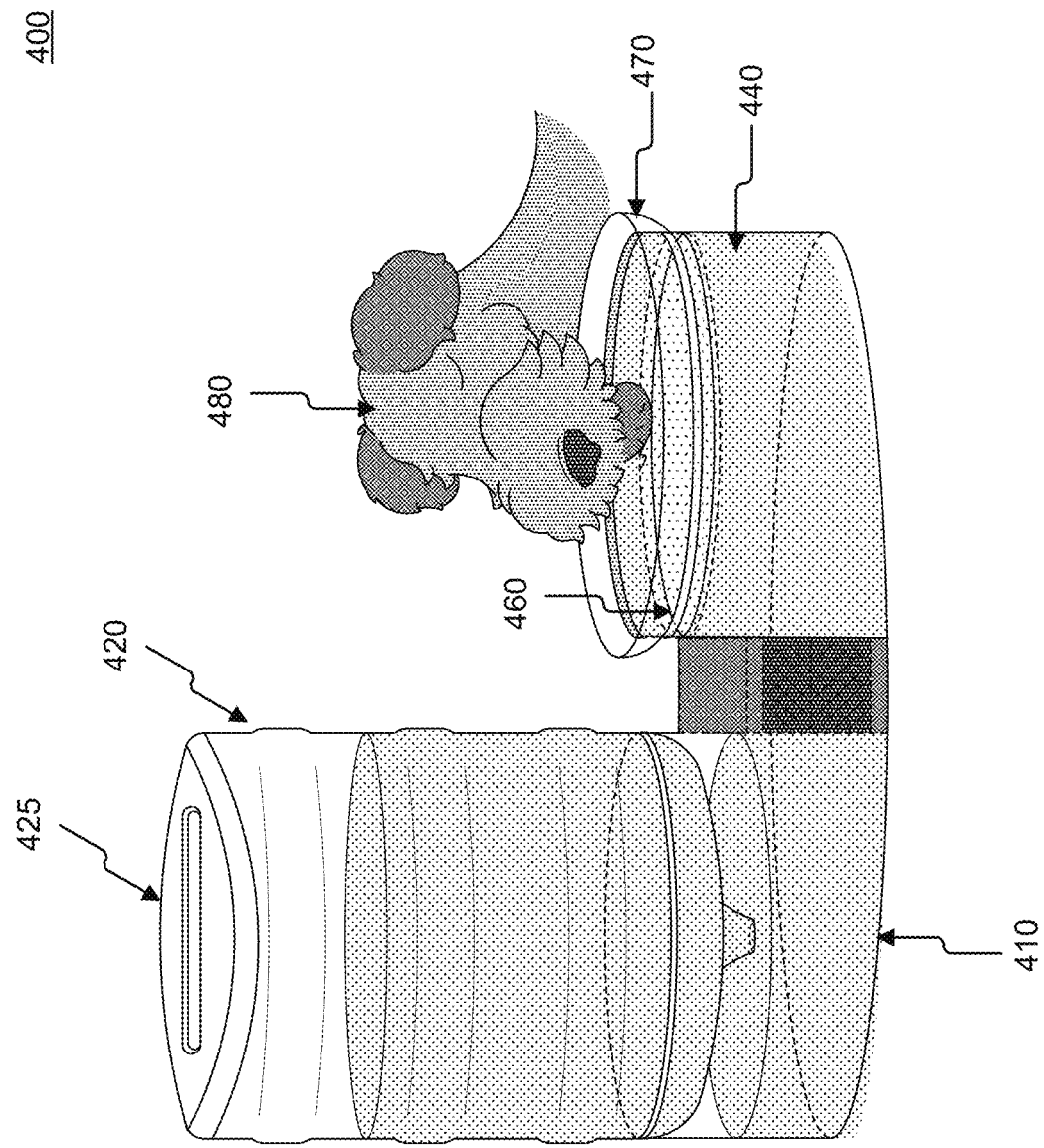
FIG. 4 illustrates a pet water bowl with tank during use, according to some embodiments of the present disclosure.

Referring now to FIG. 4, a pet water bowl with tank, according to some embodiments of the present disclosure, is illustrated during use. The tank 420 may include a lid 425 that may allow case of access to the tank 420 for refilling purposes. As a dog's 480 muzzle presses downward on the buoyant stopper 460, the stopper 460 momentarily submerges below the annular ridge of the removable rim 470, allowing a fresh layer of water to flow from the dispensing basin 440 over the stopper's 460 upper surface for immediate access. Once the animal pauses or withdraws, buoyancy rapidly re-elevates the stopper 460, re-seating it beneath the rim and reducing the exposed water to only a shallow film. This action limits the volume that can be pawed or flung outward, while any incidental splashes that occur are intercepted by the rim 470, which directs runoff back into the basin rather than onto surrounding floors. Consequently, the cooperating stopper-and-rim assembly provides a self-regulating drinking surface that satisfies the animal's hydration needs while minimizing mess and water waste.

In some embodiments, the removable rim 470 may be supplied in interchangeable height collars to accommodate a wide range of breeds and life stages. In some embodiments, the entire base 410 may be seated on an optional riser pedestal to position the exposed water at an ergonomically appropriate height. Elevating the bowl may reduce the amount that a pet would need to bend its head forward and reduce swallowing effort for large or senior dogs, promoting more comfortable hydration and potentially mitigating digestive issues associated with stooping.

In some embodiments, the pet water bowl 400 may include a splash-shield configured to snap onto the outer edge of rim 470 or integrally molded as an upward flare. The splash shield may be configured to guide cars and loose skin of long-eared or heavy-jowled breeds away from the water surface while the animal drinks. This minimizes the pet's car from soaking in the water and the subsequent dripping that can soil nearby flooring or bedding.

Figure 5:
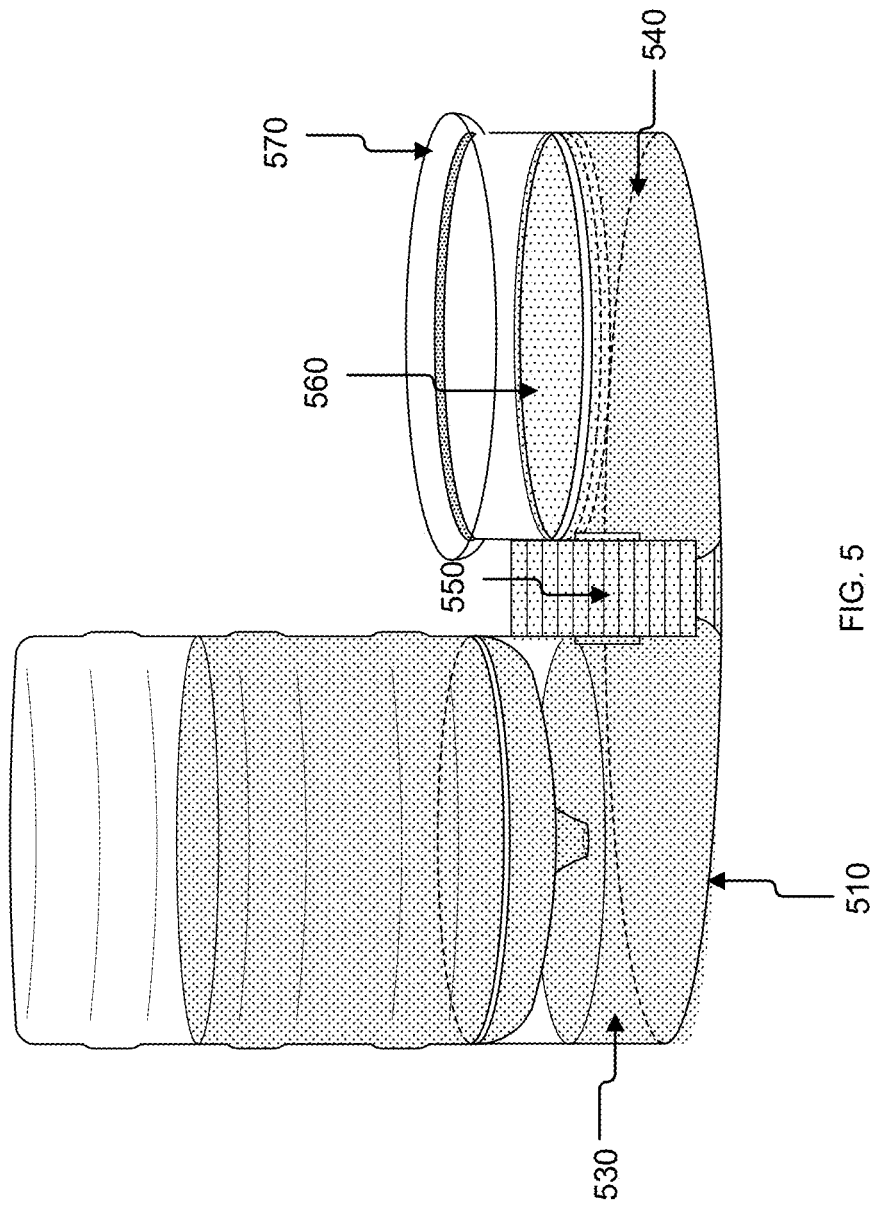
FIG. 5 illustrates a pet water bowl with tank, according to some embodiments of the present disclosure.

Referring now to FIG. 5, a pet water bowl with tank 500, according to some embodiments of the present disclosure, is illustrated. The pet water bowl with tank's 500 overall architecture parallels the passive design of FIG. 1, which include a base 510 that defines a reserve basin 530, a dispensing basin 540, and a removable rim 570 that captures a buoyant stopper 560. The pet water bowl with tank 500 incorporates an active filter 550 positioned in the flow path between the two basins. The active filter 550 encloses a low-voltage, submersible pump that draws water from the reserve basin 530 through a multi-stage cartridge (e.g., mechanical screen, activated carbon, and a micro-porous or hollow-fiber membrane) and discharges the purified stream into the dispensing basin 540; optional UV-C LEDs or ion-exchange resins housed within the module provide additional sterilization or mineral conditioning. The pump may be governed by an integral water-level sensor, programmable timer, or app-controlled microcontroller. In some embodiments, the pump 550 may be a one-way pump is configured to resupply water to the dispensing basin 540. In other alternatives, the pump 550 may be a two-way pump, or two one way pumps configured to direct water between the basins. The active pump 550 may be configured to periodically circulate water between the reserve basin 530 and the dispensing basin 540 even when the pet is not drinking to maintain freshness while preventing stagnation. Power may be supplied via a detachable USB-C cable, rechargeable battery pack, or a fixed charging cable. The entire filter cartridge may be released with a quarter-turn bayonet for tool-free replacement. In concert with the rim-and-stopper assembly, the active filter 550 delivers a continuously refreshed, spill-resistant water supply that augments the baseline hygiene provided by the passive configurations.

Figure 6:
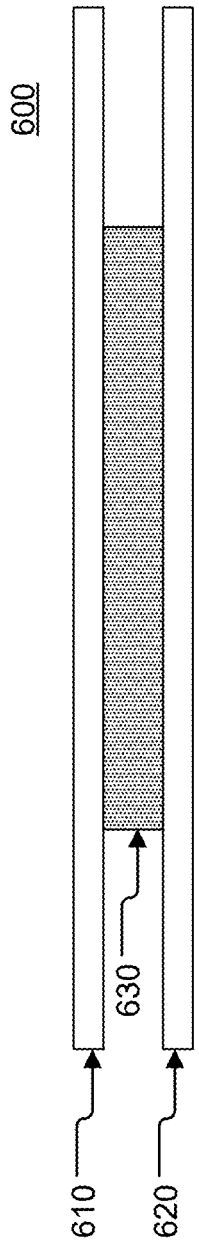
FIG. 6 illustrates a cross-sectional view of a stopper, according to some embodiments of the present disclosure.

Referring now to FIG. 6, a cross-sectional view of a stopper 600, according to some embodiments of the present disclosure, is illustrated. The stopper 600 comprises a rigid, generally circular top plate 610 and a parallel bottom plate 620 joined by at least one peripheral or central standoff 630 that fixes a predetermined spacing between the plates. The intervening air gap imparts sufficient buoyancy for the structure to float and self-elevate within the dispensing basin. The standoff 630 may also act as a shear web that resists flexure when a pet's muzzle depresses the stopper 600, ensuring that the two plates remain planar and the rim seal remains uniform. Outer edges of the plates may be rounded or chamfered to reduce splash, and the exposed upper surface of the top plate 610 can be textured or coated with an antimicrobial additive to enhance hygiene. In some embodiments, the gap between the plates may be filled with closed-cell foam or low-density polymer to increase buoyancy.

Figure 7:
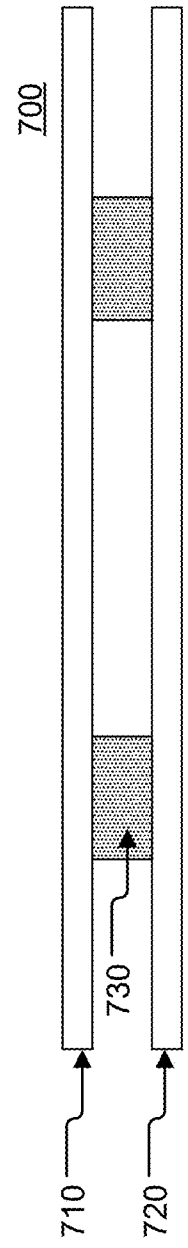
FIG. 7 illustrates a cross-sectional view of a stopper, according to some embodiments of the present disclosure.

Referring now to FIG. 7, a cross-sectional view of a stopper 700, according to some embodiments of the present disclosure, is illustrated. The stopper 700 comprises a rigid, generally circular top plate 710 and a parallel bottom plate 720 joined by two peripheral standoff 730 that fixes a predetermined spacing between the plates. The intervening air gap imparts sufficient buoyancy for the structure to float and self-elevate within the dispensing basin. The standoff 730 may also act as a shear web that resists flexure when a pet's muzzle depresses the stopper 700, ensuring that the two plates remain planar and the rim seal remains uniform. Outer edges of the plates may be rounded or chamfered to reduce splash, and the exposed upper surface of the top plate 710 can be textured or coated with an antimicrobial additive to enhance hygiene. In some embodiments, the gap between the plates may be filled with closed-cell foam or low-density polymer to increase buoyancy.

Figure 8:
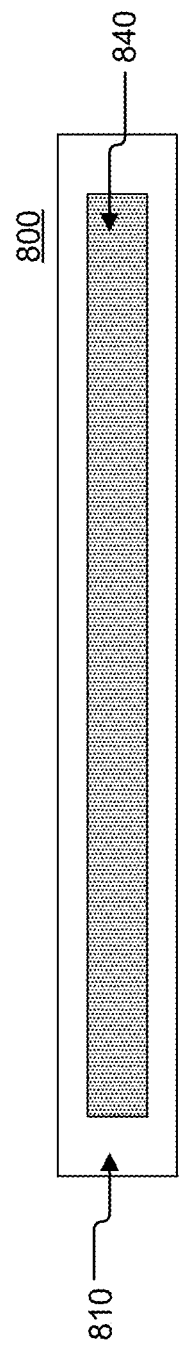
FIG. 8 illustrates a cross-sectional view of a stopper, according to some embodiments of the present disclosure.

Referring now to FIG. 8, a cross-sectional view of a stopper 800, according to some embodiments of the present disclosure, is illustrated. In this configuration the stopper is formed as a single, sealed shell 810 so that its upper and lower walls are continuous around the entire perimeter. Within the shell 810 is an enclosed air chamber 840 that extends substantially across the interior, providing the necessary buoyant force without the need for separate plates or discrete standoffs. The monolithic body thus presents a smooth, snag-free exterior that is easy to rinse clean, while the internal void keeps the stopper afloat even under repeated compressive loads from a drinking pet. To safeguard against accidental puncture, the chamber 840 may optionally be foam-filled or partitioned by thin internal ribs. The outer edges of the stopper 800 may be chamfered to cooperate with the basin rim and minimize splash as the stopper rises and falls. Antimicrobial additives or surface texturing can be molded into the exposed face of shell 810 to further enhance hygiene.

Figure 9:
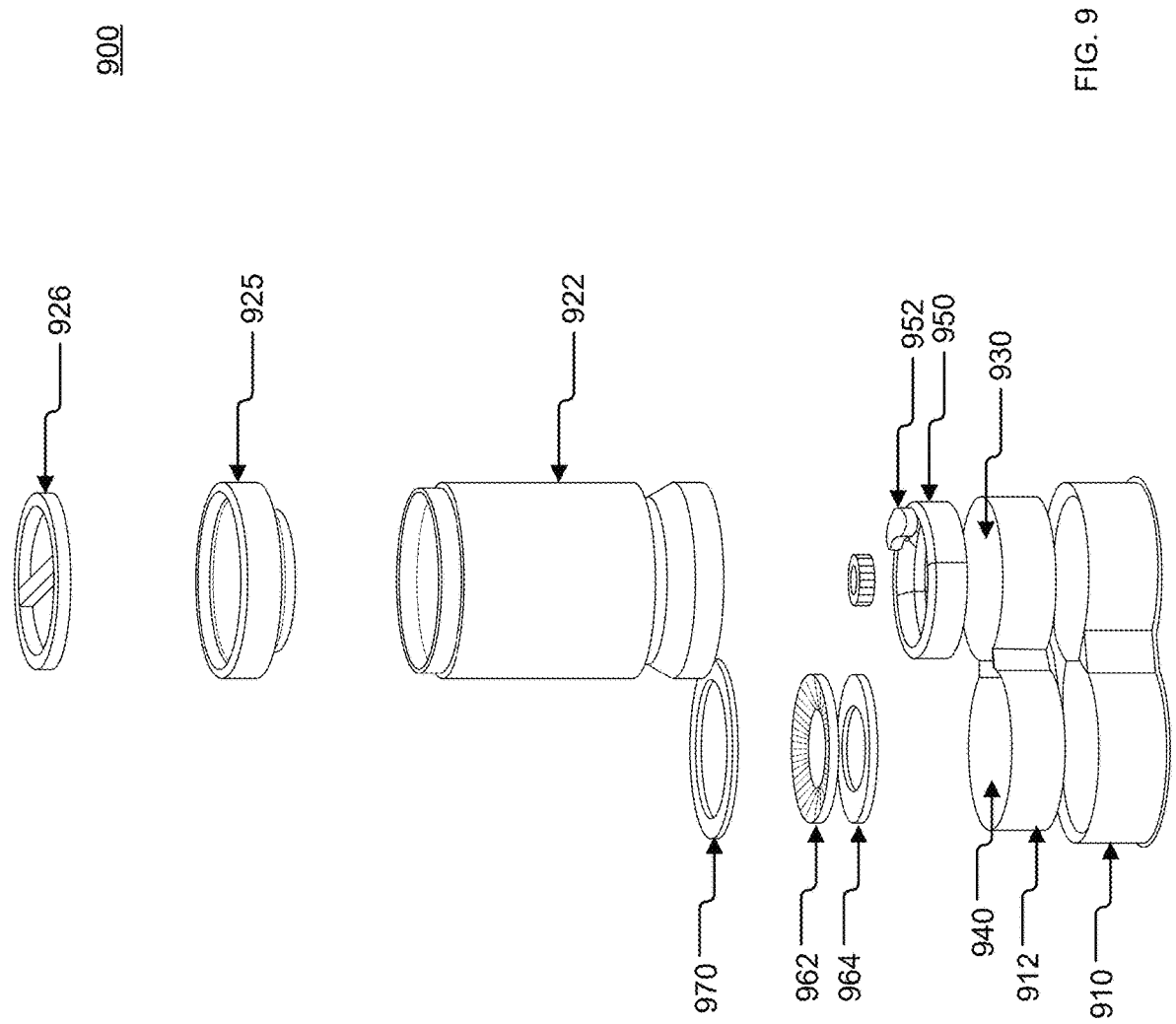
FIG. 9 illustrates a pet water bowl with tank, according to some embodiments of the present disclosure.

Referring now to FIG. 9, a pet water bowl with tank 900, according to some embodiments of the present disclosure, is illustrated. The pet water bowl with tank 900 includes a base 910 and an overlying tank 920.

The base 910 includes a removable bowl 912, a removable rim 970, and a filter assembly 950. The bowl 912 is configured to fit within the base 910. The bowl 912 may be formed from food-grade stainless steel (e.g., 304 or 316), anodized aluminum, glazed ceramic, tempered glass, or BPA-free polymers such as polypropylene, or ABS. In some embodiments, the bowl 912 may be treated with antimicrobial or non-stick coating to reduce microbial growth. In some embodiments, the bowl 912 may be manufactured as double-walled with appropriate insulation. The upper edge of the bowl 912 includes a peripheral lip or flange configured to engage with a complementary ledge of or an internal boss on the side walls of the base 912. In some embodiments, the internal boss may be omitted, allowing the bowl 912 to rest on the floor of the base 910. In some embodiments, a gasket may be included on the ledge to establish a drip barrier between the base 910 and the bowl 912. The bowl 912 is internally portioned into a reserve basin 930 and a dispensing basin 940, the two basins being placed in fluid communication through a passage.

The dispensing basin 940 includes a buoyant stopper. The stopper may include a top portion 962 and a bottom portion 964. The top portion 962 and the bottom portion 964 may mechanically attach to each other in a manner that allows the two parts to be disassembled for cleaning. The top portion 962 includes a recessed portion around its center and slits along the chamfered sections to allow water to pass through. When the stopper is assembled and placed in water, the water passes through the slits and collects near the recessed center of the top portion 962. The hydrostatic lift urges the stopper up towards the opening on the dispensing basin until the stopper rises up against the removable rim 970. The hydrostatic lift prevents the stopper from sinking to the bottom, while allowing a small amount of water to collect at the top. The stopper is configured to have an external diameter smaller than the internal diameter of the dispensing basin 940, but larger than the internal diameter of the removable rim 970. This configuration allows the buoyant stopper to fit inside the dispensing basin 940, while being kept within the dispensing basin when the removable rim 970 is attached to the base 910.

The removable rim 970 is mechanically attached to the base. The attachment mechanism may be a drop-in friction fit against a gasket, a quarter-turn bayonet that engages tabs molded into the base, a threaded collar that tightens around the top portion of the base 910, a magnetic retention system using embedded magnets and a ferromagnetic ring on the bow, or a snap fit fastener.

The tank includes a housing 922, a lid 925, and a handle 926, each configured to mechanically interconnect. The housing 922 is a rigid container, preferably manufactured from a food-grade material. The housing 922 includes an upper end that is configured to engage with the lid 925. The lid 925 may attach to the housing 922 by a positive mechanical interface such as a quarter-turn bayonet, internal or external threads, or a cam-lock hatch with a gasket to establish a watertight or water-resistant seal. The handle 926 may be secured mechanically to at least one of the lid 925 or the housing 922 by pivots, screws, snap-fit pins, or riveted brackets. The secure connection allows the handle 926 to be used to carry the housing 922 to be refilled. In some embodiments, the handle 926 may include anchors or clamps to capture the lid 925, thereby restricting the lid 925 on the housing 922 to prevent the lid 925 from falling off during transport.

The housing 922 includes a lower end that is configured to engage to the filter assembly 950. The bottom of the housing 922 carries an automatically closing outlet valve (not shown). The automatically closing outlet valve may be a spring-biased, push-to-open plunger valve, self-sealing check valve, or duckbill valve. The outlet valve remains sealed when the tank 920 is detached from the filter assembly 950 to prevent spillage. The filter assembly 950 includes an actuator tab 952. As the tank 920 is placed over the filter assembly, the actuator tab 952 is pushed down on one end, which causes the other end of the actuator tab 952 to raise up and engage the outlet valve to open the flow path. The filter assembly 950 further includes a passive filter. As the water pressure within the filter assembly 950 builds, the water is pushed down by gravity through the filter and into the reserve basin 930.

The filter assembly 950 is further configured to fit into the reserve basin 930. The filter assembly 950 may be implemented as a drop-in module that seats in an opening on the base 910 and projects into the reserve basin 930. A cylindrical lower body of the filter assembly extends downward and terminates above the basin floor, while an outward mounting flange lands on a complementary shoulder around the opening. In some embodiments, a circumferential O-ring on the flange may establish a watertight seal to isolate the incoming flow from the surrounding basin wall. The filter assembly 950 may be positively retained by one of several mechanical engagement interfaces, such as a quarter-turn bayonet, internal threads engaged by a locking collar, or resilient snap tabs, to allow the filter assembly 950 to be removed for cleaning or cartridge replacement. When installed, internal passages of the filter assembly distribute filtered water through downward ports into the reserve basin. In some embodiments, the filter assembly 950 may incorporate an anti-backflow feature to prevent reverse migration toward the tank.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described components and systems can generally be integrated together in a single product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

Reference in this specification to "one embodiment," "an embodiment," any other phrase mentioning the word "embodiment", "aspect", or "implementation" means that a particular feature, structure, or characteristic described in connection with the embodiment is included in at least one embodiment of the disclosure and also means that any particular feature, structure, or characteristic described in connection with one embodiment can be included in any embodiment or can be omitted or excluded from any embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others and may be omitted from any embodiment. Furthermore, any particular feature, structure, or characteristic described herein may be optional.

Similarly, various requirements are described which may be requirements for some embodiments but not other embodiments. Where appropriate any of the features discussed herein in relation to one aspect or embodiment of the invention may be applied to another aspect or embodiment of the invention. Similarly, where appropriate any of the features discussed herein in relation to one aspect or embodiment of the invention may be optional with respect to and/or omitted from that aspect or embodiment of the invention or any other aspect or embodiment of the invention discussed or disclosed herein.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

What is claimed is:

1. An apparatus including:
   a base;
   a reserve basin and a dispensing basin formed in the base, wherein the reserve basin is in fluid communication with the dispensing basin;
   a tank seated on the base and configured to deliver a liquid into the reserve basin;
   a buoyant stopper positioned in the dispensing basin;
   a rim removably coupled to the dispensing basin, the rim having an annular ridge with an inner circumference smaller than an outer circumference of the stopper; and
   a filter disposed along a flow path of the fluid extending from the tank to the stopper, the flow path passing through the reserve basin and the dispensing basin, wherein the liquid delivered from the tank travels along the flow path through the filter, and wherein the stopper is configured to float upward to contact the rim and limit a height of the liquid in the dispensing basin and to be depressed by a pet to allow additional liquid to flow over the stopper.

2. The apparatus of claim 1, wherein the filter includes a multilayer passive cartridge.

3. The apparatus of claim 2, wherein the multilayer passive cartridge of the filter includes a pre-screen, activated-carbon granules, and a micro-porous membrane.

4. The apparatus of claim 1, wherein the filter further includes a low-voltage pump configured to circulate the liquid through the filter.

5. The apparatus of claim 4, wherein the filter further includes ultraviolet-C light emitters arranged to sterilize the liquid.

6. The apparatus of claim 1, wherein the stopper includes a top plate, a bottom plate, and a standoff that spaces the top plate and the bottom plate apart to define an internal air chamber providing buoyancy.

7. The apparatus of claim 1 further including a removable bowl insert, wherein the removable bowl insert is placed in the base to form a barrier between the liquid and the walls of the base.

8. The apparatus of claim 1, wherein the stopper is biased upward toward the rim by a spring anchored to a floor of the dispensing basin.

9. The apparatus of claim 1, further including a sensor configured to detect displacement of the stopper and a wireless transmitter configured to communicate fluid-level data to an external device.

10. A method of dispensing filtered water to a pet including:
    providing an apparatus including:
      a base;
      a reserve basin and a dispensing basin formed in the base;
      a tank seated on the base and fluidly coupled to the reserve basin;
      a buoyant stopper positioned in the dispensing basin; and
      a filter disposed a filter disposed along a flow path extending from the tank to the stopper;
      a rim coupled to the dispensing basin, the rim having an annular ridge with an inner circumference smaller than an outer circumference of the stopper;
    allowing water to gravity-feed from the tank into the reserve basin;
    allowing the water to flow through the filter from the reserve basin into the dispensing basin;
    floating the stopper upward until the stopper contacts the rim and limits a maximum water height in the dispensing basin;
    depressing the stopper with a muzzle or tongue of a pet to expose water above the stopper and permit additional water flow into the dispensing basin; and
    automatically replenishing the water by admitting air into the tank when the reserve-basin level drops, whereby a fresh volume of water is delivered through the filter into the dispensing basin.

11. The method of claim 10, wherein the filter includes a multilayer passive cartridge having a pre-screen, activated-carbon granules, and a micro-porous membrane.

12. The method of claim 10, wherein the filter further includes a low-voltage pump configured to circulate water through the filter and ultraviolet-C light emitters arranged to sterilize the water.

13. The method of claim 10, wherein the stopper includes a rigid top plate, a bottom plate, and at least one standoff that spaces the plates apart to define an internal air chamber providing buoyancy.

14. The method of claim 10, wherein the apparatus further includes a sensor configured to detect displacement of the stopper and a wireless transmitter configured to communicate fluid-level data to an external device.

15. An apparatus including:
    a base;
    a removable bowl insert placed in the base, the removable bowl defining a reserve basin and a dispensing basin;
    a tank configured to supply water to the reserve basin;
    a buoyant stopper disposed within the dispensing basin;
    a flow path fluidly coupling the tank to the dispensing basin and the stopper;

a filter disposed within the flow path; and a rim positioned at an upper portion of the dispensing basin, the rim including an annular ridge defining a central aperture, wherein the buoyant stopper is configured to float upward in response to a water level in the dispensing basin to engage the annular ridge, thereby capping the dispensing basin.

16. The apparatus of claim 15, further including a spring disposed within the dispensing basin and configured to provide an upward biasing force on the buoyant stopper.

17. The apparatus of claim 15, wherein the tank is configured to gravity-feed water to the reserve basin.

18. The apparatus of claim 15, wherein the tank is removably seated on the base.

19. The apparatus of claim 15, wherein the rim is removably coupled to the dispensing basin.

20. The apparatus of claim 15, further including a sensor configured to detect the water level on the dispensing basin.

\* \* \* \* \*